United States Patent
Hua

(10) Patent No.: US 12,158,825 B2
(45) Date of Patent: Dec. 3, 2024

(54) BALANCED DATA MIRRORING DISTRIBUTION FOR PARALLEL ACCESS

(71) Applicant: Dell Products L.P., Hopkinton, MA (US)

(72) Inventor: Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 133 days.

(21) Appl. No.: 17/828,077

(22) Filed: May 31, 2022

(65) Prior Publication Data

US 2023/0385167 A1  Nov. 30, 2023

(51) Int. Cl.
*G06F 11/00* (2006.01)
*G06F 11/10* (2006.01)
*G06F 11/20* (2006.01)

(52) U.S. Cl.
CPC ...... *G06F 11/2069* (2013.01); *G06F 11/1088* (2013.01); *G06F 11/1096* (2013.01); *G06F 11/2082* (2013.01)

(58) Field of Classification Search
CPC ............. G06F 11/2069; G06F 11/1088; G06F 11/1096; G06F 11/2082
See application file for complete search history.

(56) References Cited

U.S. PATENT DOCUMENTS

| | | | | |
|---|---|---|---|---|
| 7,509,525 B2* | 3/2009 | Kleiman | ............. | G06F 11/1076 714/755 |
| 7,627,715 B1* | 12/2009 | Corbett | ............... | G06F 11/1088 711/114 |
| 8,327,185 B1* | 12/2012 | Bonwick | ............. | G06F 11/1096 714/6.24 |
| 8,595,606 B1* | 11/2013 | Feng | .................... | H03M 13/293 714/800 |
| 8,706,960 B1* | 4/2014 | Ives | ...................... | G06F 3/0683 711/170 |
| 9,026,729 B1* | 5/2015 | Hallak | .................. | G06F 11/108 711/114 |
| 11,144,396 B1* | 10/2021 | Hua | ..................... | G06F 11/2094 |
| 2005/0289387 A1* | 12/2005 | Hajji | .................. | G06F 11/2289 714/6.1 |
| 2011/0320865 A1* | 12/2011 | Jain | ....................... | G06F 3/0685 714/E11.088 |

(Continued)

*Primary Examiner* — Loan L. T. Truong
(74) *Attorney, Agent, or Firm* — Anderson Gorecki LLP

(57) ABSTRACT

Mirrored pairs in a RAID-1 are distributed in a balanced and deterministic way that increases data access parallelism. For a group of k+1 disks that can be represented as a matrix of disk rows indexed 0 through k, where each disk is organized into k same-size subdivisions, in columns indexed 1 through k, corresponding mirrors of data members on the first disk (row index 0) are distributed across all other disks along a matrix diagonal such that the row index is the same as the column index for each mirror. Additional mirror pairs are created and symmetrically distributed in two submatrix triangles that are defined and separated by the diagonal. The two triangles are populated with symmetrically distributed mirrors that are flipped around the matrix diagonal such that for any mirror data in one triangle, its corresponding mirror data can be found in the other triangle by swapping the row and column indices.

20 Claims, 10 Drawing Sheets

| disk/# | 1 | 2 | 3 | 4 | 5 | 6 | * | 85 | 86 | 87 | 88 | 89 | 90 |
|---|---|---|---|---|---|---|---|---|---|---|---|---|---|
| 0 | $a_1$ | $b_1$ | $c_1$ | $d_1$ | $e_1$ | $f_1$ | * | $a_x$ | $b_x$ | $c_x$ | $d_x$ | $e_x$ | $f_x$ |
| 1 | $a_1$ | | | | | | * | $a_x$ | | | | | |
| 2 | | $b_1$ | | | | | * | | $b_x$ | | | | |
| 3 | | | $c_1$ | | | | * | | | $c_x$ | | | |
| 4 | | | | $d_1$ | | | * | | | | $d_x$ | | |
| 5 | | | | | $e_1$ | | * | | | | | $e_x$ | |
| 6 | | | | | | $f_1$ | * | | | | | | $f_x$ |

(56) References Cited

U.S. PATENT DOCUMENTS

| | | | |
|---|---|---|---|
| 2012/0198195 A1* | 8/2012 | Wylie | G06F 11/1076 |
| | | | 711/170 |
| 2016/0239397 A1* | 8/2016 | Thomas | G06F 3/0689 |
| 2016/0266984 A1* | 9/2016 | Diederich | G06F 3/0619 |
| 2017/0212805 A1* | 7/2017 | Zhu | H03M 13/3761 |
| 2019/0073265 A1* | 3/2019 | Brennan | G06F 3/061 |
| 2019/0188099 A1* | 6/2019 | Roberts | G06F 11/2082 |
| 2019/0205055 A1* | 7/2019 | Narayanam | G06F 3/067 |
| 2021/0034267 A1* | 2/2021 | Kucherov | G06F 11/1088 |
| 2021/0124490 A1* | 4/2021 | Wu | G06F 3/0689 |
| 2022/0083238 A1* | 3/2022 | Kumar | G06F 9/45558 |
| 2022/0171685 A1* | 6/2022 | Xiang | G06F 11/2064 |

* cited by examiner

| disk/# | 1 | 2 | 3 | 4 | 5 | 6 |
|---|---|---|---|---|---|---|
| 0 | A | B | C | D | E | F |
| 1 | A | G | H | I | J | K |
| 2 | G | B | L | M | N | O |
| 3 | H | L | C | P | Q | R |
| 4 | I | M | P | D | S | T |
| 5 | J | N | Q | S | E | U |
| 6 | K | O | R | T | U | F |

Figure 5

| disk/# | 1 | 2 | 3 | 4 | 5 | 6 | * | 85 | 86 | 87 | 88 | 89 | 90 |
|---|---|---|---|---|---|---|---|---|---|---|---|---|---|
| 0 | $a_1$ | $b_1$ | $c_1$ | $d_1$ | $e_1$ | $f_1$ | * | $a_x$ | $b_x$ | $c_x$ | $d_x$ | $e_x$ | $f_x$ |
| 1 | $a_1$ | | | | | | * | $a_x$ | | | | | |
| 2 | | $b_1$ | | | | | * | | $b_x$ | | | | |
| 3 | | | $c_1$ | | | | * | | | $c_x$ | | | |
| 4 | | | | $d_1$ | | | * | | | | $d_x$ | | |
| 5 | | | | | $e_1$ | | * | | | | | $e_x$ | |
| 6 | | | | | | $f_1$ | * | | | | | | $f_x$ |

Figure 6

| disk/# | 1 | 2 | 3 | 4 | 5 | 6 |
|---|---|---|---|---|---|---|
| 0 | a | b | c | d | e | f |
| 1 | a | g | h | i | j | k |
| 2 | g | b | l | m | n | o |
| 3 | h | l | c | p | q | r |
| 4 | i | m | p | d | s | t |
| 5 | j | n | q | s | e | u |
| 6 | k | o | r | t | u | f |

Figure 7

| disk/# | 1 | 2 | 3 | 4 | 5 | 6 |
|---|---|---|---|---|---|---|
| 0 | a | b | c | d | e | f |
| 1 | a | g | h | i | j | k |
| 2 | g | b | l | m | n | o |
| 3 | h | l | c | p | q | r |
| 4 | i | m | p | d | s | t |
| 5 | j | n | q | s | e | u |
| 6 | k | o | r | t | u | f |

Figure 8

| disk/# | 1 | 2 | 3 | 4 | 5 | 6 |
|---|---|---|---|---|---|---|
| 0 | a | b | c | d | e | f |
| 1 | a | g | h | i | j | k |
| 2 | g | b | l | m | n | o |
| 3 | h | l | c | p | q | r |
| 4 | i | m | p | d | s | t |
| 5 | j | n | q | s | e | u |
| 6 | k | o | r | t | u | f |

Figure 9

| disk/# | 1 | 2 | 3 | 4 | 5 |
|---|---|---|---|---|---|
| 0 | a | b | c | d | e |
| 1 | a | f | g | h | i |
| 2 | f | b | j | k | l |
| 3 | g | j | c | m | n |
| 4 | h | k | m | d | o |
| 5 | i | l | n | o | e |

Figure 10

| disk/# | 1 | 2 | 3 | 4 | 5 |
|---|---|---|---|---|---|
| 0 | a | b | c | d | e |
| 1 | a | f | g | h | i |
| 2 | f | b | j | k | l |
| 3 | g | j | c | m | n |
| 4 | h | k | m | d | o |
| 5 | i | l | n | o | e |

Figure 11

| disk/# | 1 | 2 | 3 | 4 | 5 | 6 | * | 85 | 86 | 87 | 88 | 89 | 90 |
|---|---|---|---|---|---|---|---|---|---|---|---|---|---|
| 0 |   |   | c |   |   |   | * |   |   | w |   |   |   |
| 1 |   |   | a |   |   |   | * |   |   | u |   |   |   |
| 2 |   |   | b |   |   |   | * |   |   | v |   |   |   |
| 3 | a | b | c | d | e | f | * | u | v | w | x | y | z |
| 4 |   |   | d |   |   |   | * |   |   | x |   |   |   |
| 5 |   |   | e |   |   |   | * |   |   | y |   |   |   |
| 6 |   |   | f |   |   |   | * |   |   | z |   |   |   |

| disk/# | 1 | 2 | 3 | 4 | 5 | 6 | * | 85 | 86 | 87 | 88 | 89 | 90 |
|---|---|---|---|---|---|---|---|---|---|---|---|---|---|
| 21 |   |   |   |   | e |   | * |   |   |   | u |   |   |
| 22 |   |   |   | d |   |   | * |   |   |   |   |   | z |
| 23 |   |   | c |   |   |   | * |   |   |   |   | y |   |
| 24 |   | b |   |   |   |   | * |   |   |   | x |   |   |
| 25 | a |   |   |   |   |   | * |   |   | w |   |   |   |
| 26 |   |   |   |   |   | f | * |   | v |   |   |   |   |

Figure 12

BALANCED DATA MIRRORING DISTRIBUTION FOR PARALLEL ACCESS

TECHNICAL FIELD

The subject matter of this disclosure is generally related to data mirroring in a data storage system.

BACKGROUND

Data storage systems typically include disk drives that are organized into redundant array of independent disks (RAID) groupings. Different RAID levels are defined by standards. In a RAID-0, data is striped across multiple drives. In a RAID-1, data on a first disk is mirrored on a second disk. In other RAID levels, e.g., RAID-5, parity is calculated from data and stored in order to enable a failed disk to be rebuilt using a combination of data and parity. Striping tends to reduce data access latency by increasing parallelism. Data can be accessed with lower latency from multiple disks in parallel in comparison with access from a single disk serially. However, striping does not provide data protection. Mirroring provides protection against data loss. Parity-based data protection requires less storage space than mirroring at the cost of parity calculation.

SUMMARY

In accordance with some implementations, a method comprises: creating an integer multiple of k equal size subdivisions on k+1 drives; distributing data members of a first mirror of a first mirror pair on a first one of the k+1 drives; and distributing data members of a second mirror of the first mirror pair on other ones of the k+1 drives such that only one data member of the second mirror is located on any one of the other ones of the k+1 drives.

In accordance with some implementations, a non-transitory computer-readable storage medium stores instructions that when executed by a computer cause the computer to perform a method with a storage system comprising a plurality of non-volatile data storage drives, the method comprising: creating an integer multiple of k equal size subdivisions on k+1 drives; distributing data members of a first mirror of a first mirror pair on a first one of the k+1 drives; and distributing data members of a second mirror of the first mirror pair on other ones of the k+1 drives such that only one data member of the second mirror is located on any one of the other ones of the k+1 drives.

In accordance with some implementations, an apparatus comprises: a storage array comprising: at least one compute node comprising at least one processor and non-transitory computer-readable memory; a plurality of non-volatile drives; and a drive manager configured to: create an integer multiple of k equal size subdivisions on k+1 of the drives; distribute data members of a first mirror of a first mirror pair on a first one of the k+1 drives; and distribute data members of a second mirror of the first mirror pair on other ones of the k+1 drives such that only one data member of the second mirror is located on any one of the other ones of the k+1 drives.

This summary is not intended to limit the scope of the claims or the disclosure. Other aspects, features, and implementations will become apparent in view of the detailed description and figures, and all the examples, aspects, implementations, and features can be combined in any technically possible way.

BRIEF DESCRIPTION OF THE FIGURES

FIG. 5 illustrates how deterministic distribution of protection group members facilitates finding mirrors for recovery from disk failure.

FIG. 6 illustrates balanced data mirroring distribution with multiple submatrices of k subdivisions.

FIGS. 7 through 9 illustrate provisioning of mirror pairs of a submatrix to data devices when k+1 is an odd number.

FIGS. 10 and 11 illustrate provisioning of mirror pairs of a submatrix to data devices when k+1 is an even number.

FIG. 12 illustrates distribution and use of spares to recover from disk failure.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features such as, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
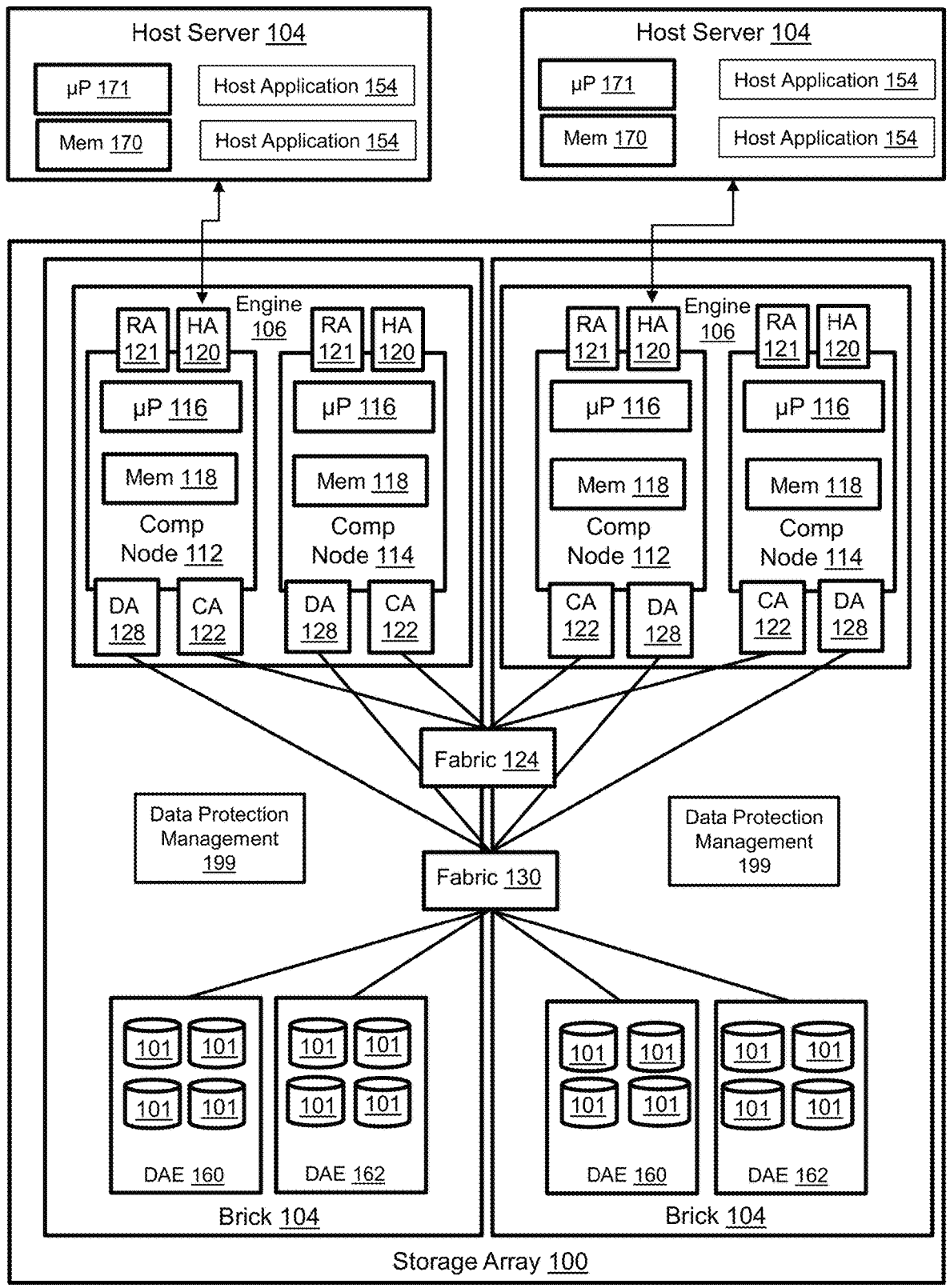
FIG. 1 illustrates a simplified data center environment with host servers and a storage array configured with data protection management software that implements balanced data mirroring distribution.

FIG. 1 illustrates a simplified data center environment with host servers 104 and a storage array 100 with data protection management software 199 that implements balanced data mirroring distribution. As will be explained in greater detail below, at least one mirror of a RAID-1 is distributed across multiple drives. Further, logical data devices are configured with mirror pairs so that disk access is parallelized and balanced to facilitate recovery from disk failure while reducing data access latency relative to a two-disk RAID-1. Those of ordinary skill in the art will recognize that the storage array would typically support more than two host servers and the data center could include multiple storage arrays.

The host servers 104 include volatile memory 170 and one or more tangible processors 171. The memory and processors are used to run instances of host applications 154. An individual host server may simultaneously support instances of a single host application or instances of multiple host applications. Instances of host applications prompt generation of input-output commands (IOs) to read and/or write host application data that is maintained by the storage array 100 on managed drives 101. Examples of host applications may include, but are not limited to, software for email, sales, accounting, inventory control, manufacturing, engineering, and a wide variety of other functions.

The storage array 100 includes one or more bricks 104. Each brick includes an engine 106 and one or more disk array enclosures (DAEs) 160, 162. Each engine 106 includes a pair of interconnected compute nodes 112, 114 that are arranged in a failover relationship with mirrored local memory 118 and may be referred to as "storage directors." Although it is known in the art to refer to the compute nodes of a SAN as "hosts," that naming convention is avoided in this disclosure to help distinguish the host servers 104 from the compute nodes 112, 114. Nevertheless, the host applications could run on the compute nodes. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with the managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. Disk controllers may be associated with the managed drives as is known in the art. An interconnecting fabric 130 enables all disk adapters to communicate with all managed drives. The managed drives 101 include non-volatile storage media that may be of any type, e.g., solid-state drives (SSDs) based on EEPROM technology such as NAND and NOR flash memory and hard disk drives (HDDs) with spinning disk magnetic storage media.

Figure 2:
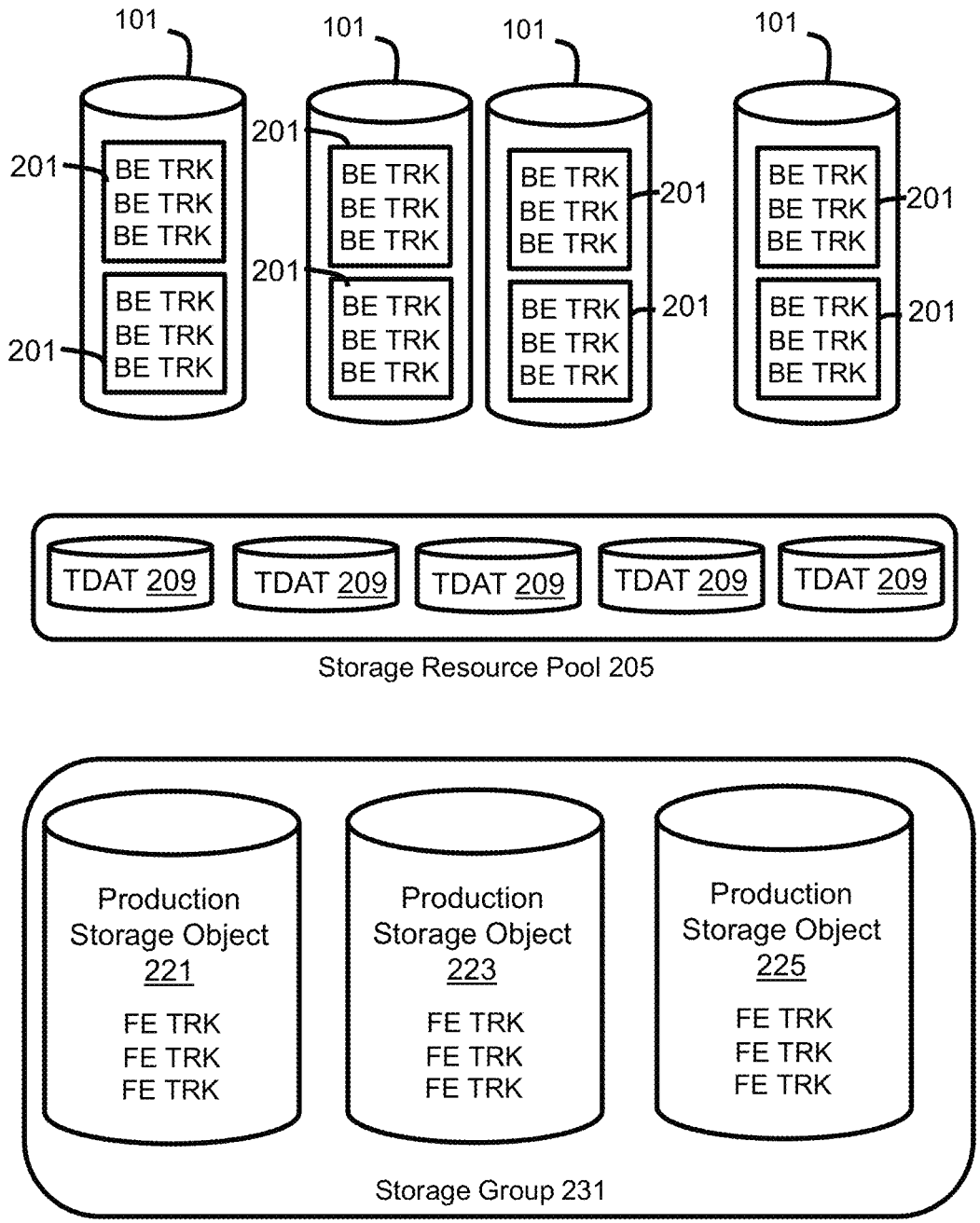
FIG. 2 illustrates aspects of storage abstraction by the storage array.

Referring to FIGS. 1 and 2, the managed drives 101 are not discoverable by the host servers 104 but the storage array 100 creates and presents storage objects 221, 223, 225 that can be discovered by the host servers. Without limitation, storage objects may be referred to as storage or data devices, volumes, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers, each production storage object is a single disk having a set of contiguous logical block addresses (LBAs) on which data used by the instances of a host application resides. However, the host application data is stored at non-contiguous addresses on various managed drives 101. A storage group 231 containing multiple production storage objects may be created for the instances of an individual host application. Multiple instances of a single host application may use data from the same storage group, but instances of different host applications generally do not use data from the same storage group. The storage array may maintain a large number of production storage objects and storage groups.

The compute nodes 112, 114 maintain metadata that maps between the LBAs of the production storage objects 221, 223, 225 and physical addresses on the managed drives 101 in order to process IOs from the host servers. The basic allocation unit of storage capacity that is used by the compute nodes 112, 114 to access the managed drives 101 is a back-end track (BE TRK). The managed drives may be configured with subdivisions 201, each of which may contain multiple BE TRKs. Groupings of subdivisions from different managed drives are used to create a RAID-1 protection groups that include mirrored subdivisions. A storage resource pool 205 is a grouping of storage objects known as thin data devices (TDATs) 209 that contain RAID protection groups of the same type. Storage resource pools are used to create the production storage objects. The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figures 3, 4:
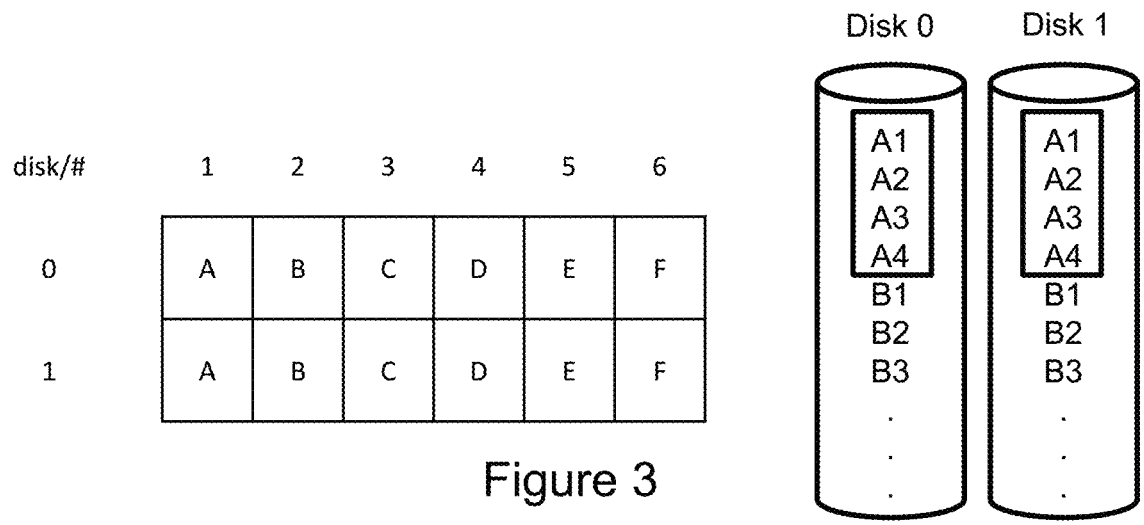
FIGS. 3 and 4 illustrate redistribution of data members of mirrors across multiple disks.

FIGS. 3 and 4 illustrate redistribution of protection group data members of mirrors across multiple disks. The disks, which are managed drives of the storage array, are represented as a matrix of k+1 disks, in rows indexed 0 through k, that are organized into k same-size subdivisions, in columns indexed 1 through k. The RAID-1 standard requires that a data set and a copy of the data set must be stored on different disks. The data set and the copy are referred to herein individually as mirrors and together as a mirror pair or pair of corresponding mirrors. Each mirror may include multiple data members, e.g., data members A1 through A4 of mirror A. FIG. 3 illustrates a standard RAID-1 data mirroring layout with a pair of disks, where all data mirrors of one failed disk can be found on the other disk. Mirrors A-F are on same-subdivisions 1-6 of disks 0 and 1, e.g., mirror pair A is on subdivision 1 of both disk 0 and disk 1. There is no parallelism. FIG. 4 illustrates deterministic redistribution of mirrors B, C, D, E, and F from disk 1 to disks 2 through 6, resulting in parallelism. The corresponding mirrors of A-F on the first disk (row index 0) are distributed across all other disks along a matrix diagonal from subdivision 1 of disk 1 subdivision 6 of disk 6 such that the row index is the same as the column index for each mirror. For example, mirror A resides at disk 1, subdivision 1, mirror B resides at disk 2, subdivision 2, etc. Additional mirror pairs are created and symmetrically distributed in two (unshaded) submatrix triangles that are defined and separated by the diagonal. The two triangles are populated with symmetrically distributed mirrors that are flipped around the matrix diagonal such that for any mirror data in one triangle, its corresponding mirror data can be found in the other triangle by swapping the row and column indices, e.g., mirror pair G at subdivision 1 of disk 2 and subdivision 2 of disk 1. With reference to the matrix, mirror data at row X column Y shall find its corresponding mirror data at row Y column X. An advantage of such symmetric distribution is that mirrors of one half of the pairs are evenly spread over all disks so all data can be accessed via mirrors on other disks in parallel if any disk is overloaded or inaccessible, thereby leveraging the aggregate bandwidth of the disks. The result is reduced data access latency relative to two-disk mirrors. As will be explained below, finding corresponding mirrors is also facilitated.

FIG. 5 illustrates how deterministic distribution of protection group members facilitates recovery from disk failure. For each data subdivision on an inaccessible disk, the deterministic symmetry guarantees that the corresponding mirror of that data subdivision can be found on another disk with the same index number of the subdivision index, provided the disk and subdivision indices differ. For example, if mirror R is not accessible from disk 3, subdivision 6, then corresponding mirror R can be accessed from the mirror at disk 6, subdivision 3. If disk 3 becomes inaccessible, e.g., due to failure, then all corresponding mirrors are located on subdivision 3 of the other disks, which has the same index number of the disk/row. The intersection where the disk and subdivision indices match, which is mirror C at subdivision 3 of disk 3 in the illustrated example, has a corresponding mirror at the same subdivision on disk/row 0, e.g., mirror C at subdivision 3 of disk 0. Such deterministic distribution enables mirrors to be found using an algorithm rather than searching heuristically or relying on mapping tables, thereby reducing failure recovery time.

FIG. 6 illustrates balanced data mirroring distribution with multiple submatrices of k subdivisions. In the previous example in which each of seven disks are organized into six equal size subdivisions, each subdivision may be relatively large depending on disk capacity. Disk storage space can be organized into a larger number of subdivisions to potentially increase data access parallelism. An appropriate subdivision size can be achieved with k*x subdivisions per disk, where k is the number of columns in a conceptual submatrix with k+1 disks/rows, and x is the number of such submatrices. Each submatrix contains k mirror pairs that are distributed in the first disk (row 0) and along the diagonal from row 1 to row k. Other mirror pairs are symmetrically distributed around the diagonal. Each mirror pair is located by flipping the row and column indices. In the illustrated example, x=15, k=6, a first submatrix includes subdivisions 1-6 and an xth submatrix includes subdivisions 85-90. Each submatrix of k columns and k+1 rows has k*(k+1)/2 mirror pairs that can be provisioned for x storage objects such as data devices, e.g., TDATs. A data device may be configured using multiple mirror pairs, and each submatrix can be independently provisioned with its own data device configurations. For example, a first data device may be provisioned with mirrors referenced with subscript 1 and an xth data device may be provisioned with mirrors referenced with subscript x. Because of the symmetric distribution, mirrors will be aligned with some "axes" perpendicular to the submatrix diagonal (upper left to lower right).

FIGS. 7 through 9 illustrate provisioning of mirror pairs of a submatrix to data devices when k+1 is an odd number. FIGS. 7 and 8 illustrate examples with k=6 and each data device is provisioned with (k/2) mirror pairs. Mirror pairs of one data device including k, n, and p are shaded in FIG. 7. Mirror pairs of a data device including d, o, and q are shaded in FIG. 8. The k mirror locations of each device are on separate disks to support parallel access to k disks. The submatrix can accommodate k+1 such data devices, and mirrors tend to be aligned (upper right to lower left) as previously described. FIG. 9 shows another case with k=6. A data device shown with shading is provisioned with k+1 mirror pairs distributed over k+1 disks. The submatrix can accommodate k/2 such data devices. All mirror locations per device are evenly distributed so that each disk holds exactly 2 mirror locations. The mirrors tend to be aligned (upper right to lower left).

FIGS. 10 and 11 illustrate provisioning of mirror pairs of a submatrix to data devices when k+1 is an even number. In the illustrated examples, k=5 and each data device shown with shading is provisioned with (k+1)/2 mirror pairs distributed over k+1 disks for parallel access. The submatrix can accommodate k such devices, the mirrors of which tend to be aligned (upper right to lower left).

FIG. 12 illustrates distribution and use of spares to recover from disk failure. The free subdivisions of unused data devices are reserved as spares. When a disk failure occurs, mirror data that is unavailable from the failed disk is read from corresponding mirrors on other disks and copied to the spares. The illustrated example depicts the spares as shaded subdivisions on submatrices associated with disks 21-26. If disk 3 fails, for example, affected mirror pairs (a-f) and (u-z) within a set of disks 0-6 can be recovered using the spares from another set of disks 21-26. In this simplified case, the number of equal-size subdivisions per disk is a multiple of both 5 and 6, so that both 5-column and 6-column submatrices are configurable using the same size disks. This advantageously yields a fast recovery process as it reads from 6 disks (0, 1, 2, 4, 5, 6) and writes to 6 disks (21-26) in parallel. The writes may be further parallelized if the spares are distributed over more sets of disks.

Figure 13:
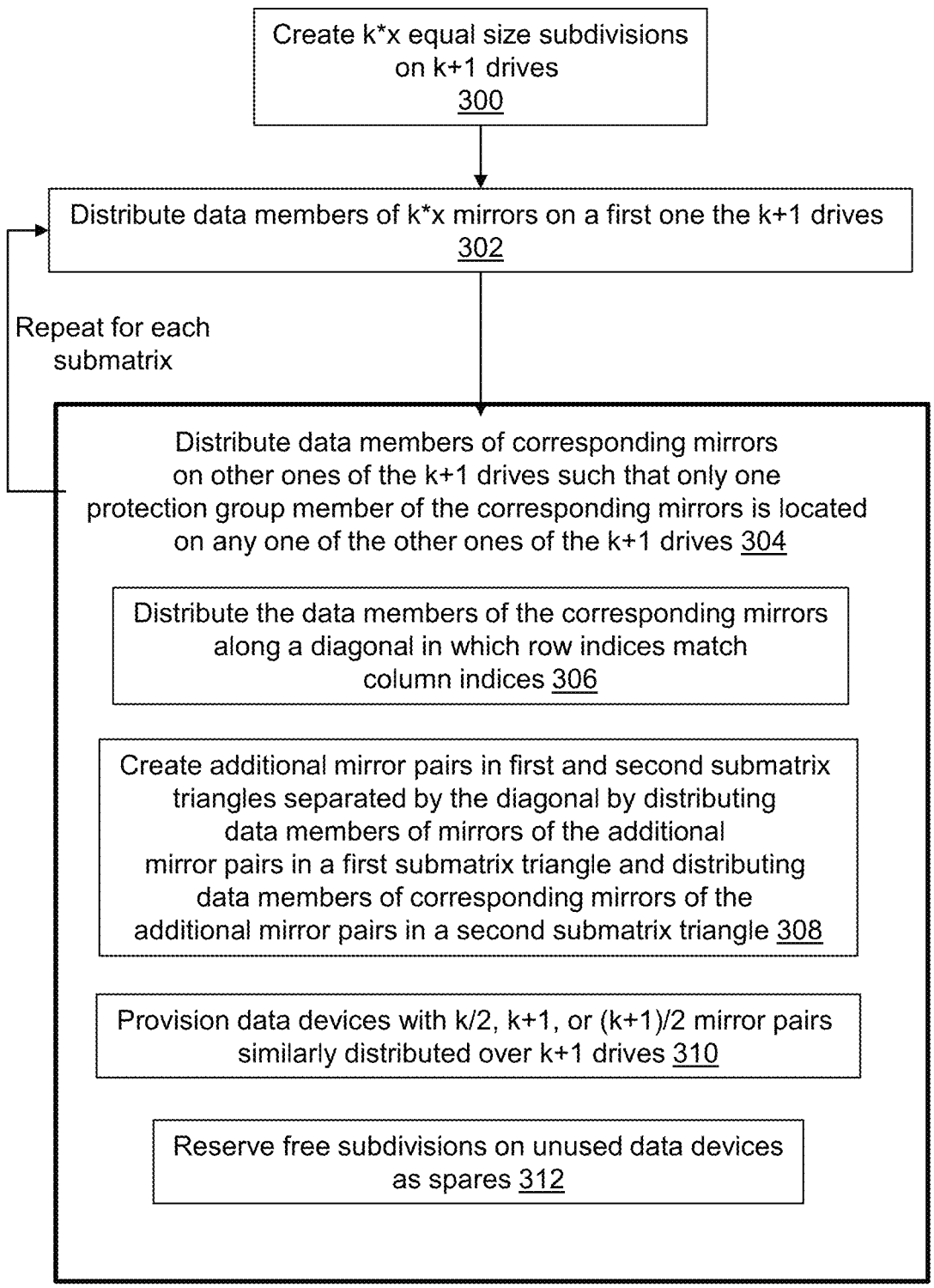
FIG. 13 illustrates a method for balanced data mirroring distribution.

FIG. 13 illustrates a method for balanced data mirroring distribution. Equal size subdivisions numbering k*x are created on k+1 drives in step 300, where x is a positive integer that indicates a number of submatrices to be created and k is a positive integer determined based on the number of managed drives being organized. Step 302 is distributing data members of k*x mirrors to a first one of the k+1 drives. Conceptually, the first one of the k+1 drives is drive 0 of a matrix of drives indexed 0 through k+1. Step 304 is distributing data members of corresponding mirrors on other ones of the k+1 drives such that only one data member of the corresponding mirrors is located on any one of the other ones of the k+1 drives. Steps 302 and 304 are repeated for each submatrix.

Step 304 may include distributing the data members of the corresponding mirrors along a diagonal in which disk/row indices match subdivision/column indices as indicated in step 306. Step 304 may include creating additional mirror pairs in first and second submatrix triangles defined by the diagonal as indicated in step 308. This is accomplished by distributing data members of mirrors of the additional mirror pairs in a first submatrix triangle and symmetrically distributing data members of corresponding mirrors of the additional mirror pairs in a second submatrix triangle such that mirror data at row X column Y shall find its corresponding mirror data at row Y column X. Step 304 may include associating mirror pairs with data devices as indicated in step 310. For example, each data device may be provisioned with k/2, k+1, or (k+1)/2 mirror pairs distributed over k+1 drives as previously described. Step 304 may include reserving free subdivisions on unused data devices as spares as indicated in step 312.

Figure 14:
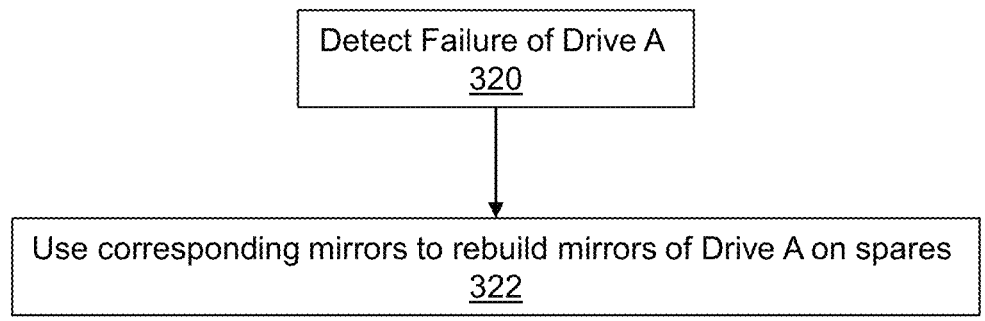
FIG. 14 illustrates a method for recovering from disk failure.

FIG. 14 illustrates a method for recovering from disk failure. Unavailability of a drive A is detected in step 320. In step 322 the corresponding mirrors on other drives are used to rebuild the mirrors of drive A on spares. The corresponding mirrors are found on another disk with the same index number as the subdivision index of the failed disk, excepting that the corresponding pair to the disk index number that matches the subdivision index number of found on disk 0.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
a storage array comprising:
at least one compute node comprising at least one processor and non-transitory computer-readable memory;
a plurality of non-volatile drives; and
a drive manager that creates mirrored pair protection groups that have only data members and do not include parity, the drive manager configured to:
create an integer multiple of k equal size subdivisions on each drive of k+1 of the drives;
create a first mirror of a first mirror pair on a first one of the k+1 drives such that a first copy of all data members of the first mirror pair are on the first one of the k+1 drives; and
distribute data members of a second mirror of the first mirror pair on other ones of the k+1 drives such that a second copy of all data members of the first mirror pair are on the other ones of the k+1 drives and only one data member of the second mirror is located on any one of the other ones of the k+1 drives.

2. The apparatus of claim 1 wherein the subdivisions and drives can be represented as a matrix of drive rows indexed 0 through k and subdivision columns indexed 1 through k and further comprising the drive manager configured to distribute the data members of the second mirror along a submatrix diagonal in which row indices match column indices.

3. The apparatus of claim 2 further comprising the drive manager configured to create additional mirror pairs in first and second submatrix triangles separated by the data members of the second mirror of the first mirror pair by distributing data members of first mirrors of the additional mirror pairs in the first submatrix triangle and distributing data members of second mirrors of the additional mirror pairs in the second submatrix triangle.

4. The apparatus of claim 3 further comprising the drive manager configured to distribute the data members of the first and second mirrors of the additional mirror pairs such that a data member at disk X, subdivision Y is mirrored by a data member at disk Y, subdivision X.

5. The apparatus of claim 4 further comprising the drive manager configured to seek a mirror of a data member of an inaccessible drive A of the k+1 drives at subdivision index A.

6. The apparatus of claim 4 further comprising the drive manager configured to provision each of a plurality of data devices with k/2, k+1, or (k+1)/2 mirror pairs distributed over k+1 drives.

7. The apparatus of claim 4 further comprising the drive manager configured to reserve unused subdivisions of unused devices as spares.

8. The apparatus of claim 1 wherein the k+1 drives are configured with k*N subdivisions such that the subdivisions and drives can be represented as N matrices of drive rows indexed 0 through k and subdivision columns indexed 1 through k*N and further comprising the drive manager configured to distribute data members of mirror along submatrix diagonals of each of the N matrices.

9. The apparatus of claim 8 further comprising the drive manager configured to create additional mirror pairs in first and second submatrix triangles of each of the N matrices.

10. A method for creating mirrored pair protection groups that have only data members and do not include parity, comprising:
creating an integer multiple of k equal size subdivisions on each drive of k+1 drives;
creating a first mirror of a first mirror pair on a first one of the k+1 drives such that a first copy of all data members of the first mirror pair are on the first one of the k+1 drives; and
distributing data members of a second mirror of the first mirror pair on other ones of the k+1 drives such that a second copy of all data members of the first mirror pair are on the other ones of the k+1 drives and only one data member of the second mirror is located on any one of the other ones of the k+1 drives.

11. The method of claim 10 wherein the subdivisions and drives can be represented as a matrix of drive rows indexed 0 through k and subdivision columns indexed 1 through k and further comprising distributing the data members of the second mirror along a submatrix diagonal in which row indices match column indices.

12. The method of claim 11 further comprising creating additional mirror pairs in first and second submatrix triangles separated by the data members of the second mirror of the first mirror pair by distributing data members of first mirrors of the additional mirror pairs in the first submatrix triangle and distributing data members of second mirrors of the additional mirror pairs in the second submatrix triangle.

13. The method of claim 12 further comprising distributing the data members of the first and second mirrors of the additional mirror pairs such that a data member at disk X, subdivision Y is mirrored by a data member at disk Y, subdivision X.

14. The method of claim 13 further comprising seeking a mirror of a data member of an inaccessible drive A of the k+1 drives at subdivision index A.

15. The method of claim 13 further comprising provisioning each of a plurality of data devices with k/2, k+1, or (k+1)/2 mirror pairs distributed over k+1 drives.

16. The method of claim 13 further comprising reserving unused subdivisions of unused devices as spares.

17. The method of claim 10 comprising configuring the k+1 drives with k*N subdivisions such that the subdivisions and drives can be represented as N matrices of drive rows indexed 0 through k and subdivision columns indexed 1 through k*N and further comprising distributing data members of mirror along submatrix diagonals of each of the N matrices.

18. The method of claim 17 further comprising creating additional mirror pairs in first and second submatrix triangles of each of the N matrices.

19. A non-transitory computer-readable storage medium with instructions that when executed by a compute node, cause the compute node to perform a method for creating mirrored pair protection groups that have only data members and do not include parity, comprising:

creating an integer multiple of k equal size subdivisions on each drive of k+1 drives;

creating a first mirror of a first mirror pair on a first one of the k+1 drives such that a first copy of all data members of the first mirror pair are on the first one of the k+1 drives; and distributing data members of a second mirror of the first mirror pair on other ones of the k+1 drives such that a second copy of all data members of the first mirror pair are on the other ones of the k+1 drives and only one data member of the second mirror is located on any one of the other ones of the k+1 drives.

20. The non-transitory computer-readable storage medium of claim 19 wherein the subdivisions and drives can be represented as a matrix of drive rows indexed 0 through k and subdivision columns indexed 1 through k and further comprising distributing the data members of the second mirror along a submatrix diagonal in which row indices match column indices.

* * * * *